(12) United States Patent
Lim

(10) Patent No.: US 9,559,409 B2
(45) Date of Patent: Jan. 31, 2017

(54) ANTENNA WITH SHIELDING APPARATUS AND MANUFACTURING METHOD

(71) Applicant: SIEMENS MEDICAL INSTRUMENTS PTE. LTD., Singapore (SG)

(72) Inventor: Seng Shin Lim, Singapore (SG)

(73) Assignee: Sivantos Pte. Ltd., Singapore (SG)

(*) Notice: Subject to any disclaimer, the term of this patent is extended or adjusted under 35 U.S.C. 154(b) by 55 days.

(21) Appl. No.: 14/628,447

(22) Filed: Feb. 23, 2015

(65) Prior Publication Data

US 2015/0244065 A1 Aug. 27, 2015

(30) Foreign Application Priority Data

Feb. 21, 2014 (DE) .......... 10 2014 203 169

(51) Int. Cl.
| | |
|---|---|
| *H01Q 1/27* | (2006.01) |
| *H01F 27/36* | (2006.01) |
| *H01F 38/14* | (2006.01) |
| *H01Q 1/52* | (2006.01) |
| *H04B 5/00* | (2006.01) |
| *H01Q 7/00* | (2006.01) |
| *H04R 25/00* | (2006.01) |

(52) U.S. Cl.
CPC ............. *H01Q 1/273* (2013.01); *H01F 27/36* (2013.01); *H01F 38/14* (2013.01); *H01Q 1/52* (2013.01); *H01Q 1/526* (2013.01); *H01Q 7/00* (2013.01); *H04B 5/0006* (2013.01); *H04R 25/65* (2013.01); *H04R 25/658* (2013.01); *Y10T 29/49016* (2015.01)

(58) Field of Classification Search
CPC ........ H01Q 1/243; H04R 25/65; H04R 25/658
USPC ........................ 343/718; 381/312, 328, 23.1
See application file for complete search history.

(56) References Cited

U.S. PATENT DOCUMENTS

| | | | |
|---|---|---|---|
| 5,981,920 A | 11/1999 | Kelly | |
| 6,940,466 B2 | 9/2005 | Terry | |
| 7,592,964 B2 | 9/2009 | Muellenborn et al. | |
| 8,698,685 B2 | 4/2014 | Ito et al. | |

(Continued)

FOREIGN PATENT DOCUMENTS

| | | |
|---|---|---|
| DE | 102008022127 A1 | 11/2009 |
| DE | 102010024439 A1 | 1/2011 |

(Continued)

*Primary Examiner* — Dameon E Levi
*Assistant Examiner* — David Lotter
(74) *Attorney, Agent, or Firm* — Laurence A. Greenberg; Werner H. Stemer; Ralph E. Locher

(57) ABSTRACT

An antenna for wireless communication of a hearing device is shielded efficiently in a simple manner from electrical and magnetic interference fields by providing a coil apparatus and a shielding apparatus. The shielding apparatus has a flexible substrate as its main body and is formed as a single piece. The shielding apparatus is subdivided into three sections by two slits having ends not reaching the edge of the substrate. The coil apparatus is inserted through the two slits in the shielding apparatus in such a way that each of the sections only partially surrounds the coil apparatus in a circumferential direction. The sleeve-type shield can thus be applied on the coil apparatus in a simple manner. A method for manufacturing an antenna for a hearing device is also provided.

11 Claims, 3 Drawing Sheets

(56) References Cited

U.S. PATENT DOCUMENTS

| | | |
|---|---|---|
| 2003/0031339 A1 | 2/2003 | Marshall et al. |
| 2009/0067649 A1* | 3/2009 | Nikles ............... H01Q 1/273 |
| | | 381/312 |
| 2009/0136068 A1* | 5/2009 | Koo ................. H05K 1/0218 |
| | | 381/322 |
| 2010/0309081 A1 | 12/2010 | Kobayashi et al. |
| 2010/0321267 A1* | 12/2010 | Ito .......................... H01Q 7/08 |
| | | 343/788 |
| 2013/0129128 A1* | 5/2013 | Wagner ............. H04R 25/602 |
| | | 381/323 |

FOREIGN PATENT DOCUMENTS

| | | |
|---|---|---|
| JP | 2002117383 A | 4/2002 |
| JP | 2008028642 A | 2/2008 |
| JP | 2011119819 A | 6/2011 |

* cited by examiner

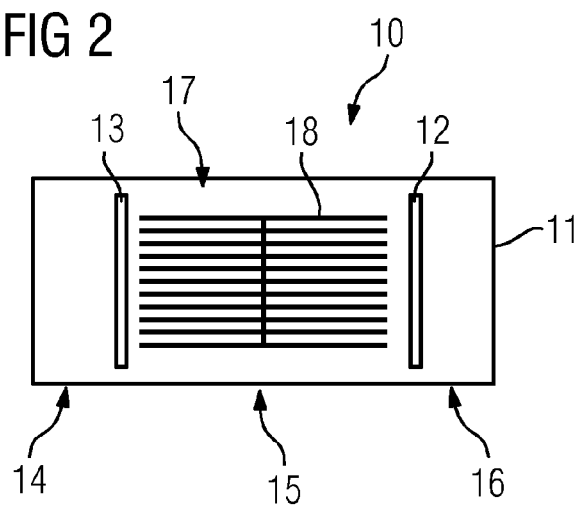
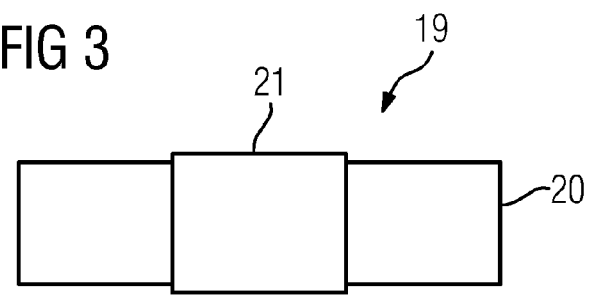
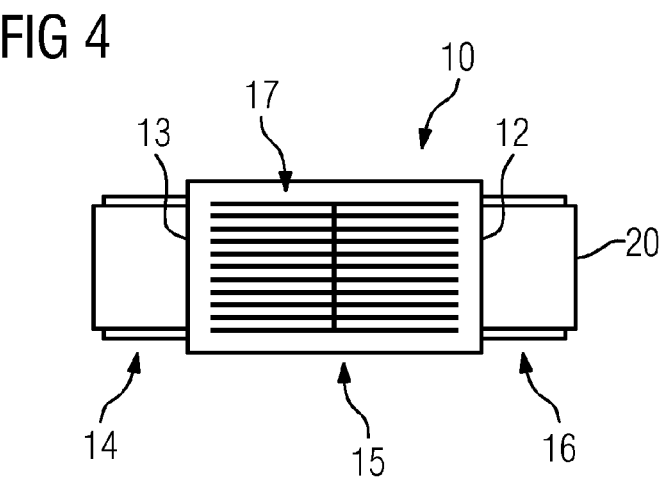

ANTENNA WITH SHIELDING APPARATUS AND MANUFACTURING METHOD

CROSS-REFERENCE TO RELATED APPLICATION

This application claims the priority, under 35 U.S.C. §119, of German Patent Application DE 10 2014 203 169.9, filed Feb. 21, 2014; the prior application is herewith incorporated by reference in its entirety.

BACKGROUND OF THE INVENTION

Field of the Invention

The present invention relates to an antenna for a hearing device with a substantially cylindrical coil apparatus as an electromagnetic transmitting and/or receiving unit and a shielding apparatus that surrounds the coil apparatus and has a flexible substrate as its main body. Furthermore, the present invention relates to a method for manufacturing an antenna for a hearing device.

Hearing apparatuses often have antennas for wireless near-field transmission. Such transmissions are used, for example, to communicate with ancillary devices or with devices of the same type (e.g. in a binaural hearing device system). Such a hearing apparatus refers to any device which can be worn on the ear and which generates an auditory stimulus, in particular a hearing device, headset, headphones and the like.

Hearing devices are wearable hearing apparatuses which are used to assist the hard-of-hearing. In order to accommodate numerous individual requirements, various types of hearing devices are available such as behind-the-ear (BTE) hearing devices, hearing devices with an external receiver (RIC: receiver in the canal) and in-the-ear (ITE) hearing devices, for example concha hearing devices or completely-in-the-canal (ITE, CIC) hearing devices as well. The hearing devices listed as examples are worn on the outer ear or in the auditory canal. Bone conduction hearing aids, implantable or vibrotactile hearing aids are also available on the market. The damaged hearing is stimulated either mechanically or electrically with those devices.

Hearing devices in principle have the following key components: an input transducer, an amplifier and an output transducer. The input transducer is generally a sound receiver, e.g. a microphone, and/or an electromagnetic receiver, e.g. an induction coil. The output transducer is usually implemented as an electro acoustic converter, e.g. a miniature loudspeaker, or as an electromechanical converter, e.g. a bone conduction receiver. The amplifier is usually integrated into a signal processing unit. That basic structure is illustrated in FIG. 1 using the example of a behind-the-ear hearing device. One or more microphones 2 for picking up ambient sound are incorporated in a hearing device housing 1 to be worn behind the ear. A signal processing unit 3, which is also integrated in the hearing device housing 1, processes and amplifies the microphone signals. The output signal of the signal processing unit 3 is transmitted to a loudspeaker or receiver 4, which outputs an acoustic signal. The sound is optionally transmitted, by way of a sound tube which is fixed with an otoplastic in the auditory canal, to the eardrum of the device wearer. Power for the hearing device and, in particular, for the signal processing unit 3 is supplied by a battery 5 which is also integrated in the hearing device housing 1.

Antennas are necessary on the receiver as well as on the transmitter for wireless transmission. Unshielded antennas are sensitive to both electrical (E field) and magnetic (H field) interferences generated by nearby electronic components. Such interference fields or interferences result in a deterioration of the wireless payload signal in such a way that the communication signal from the transmitter may not be received by the receiver or may only be received with poor quality. In that case the performance of the wireless communication system is reduced.

In order to avoid degradations of that kind, unshielded antennas for wireless connections are generally spaced apart from electronic components that emit electrical and magnetic interferences. That compromises the freedom in the positioning of the antennas in the hearing apparatus or hearing device, in particular the behind-the-ear hearing device. However, with several hearing devices it is necessary for structural reasons that the antenna for wireless transmission be disposed closer to an electronic component that produces an electrical or magnetic interference field. In such cases, shields in the form of covers or small boxes are generally provided. Specifically those electronic components which produce the undesirable electrical and magnetic interference fields are shielded or encased. Due to the different types of hearing apparatuses and electronic components thereof, numerous shielding covers of different sizes and constructions must be provided.

A surface-mounted coil for wireless transmission is known from U.S. Pat. No. 7,592,964 B2. The coil has a wire that is wound around a core. The coil also has a shielding layer that is wound around a central section of the core so that the windings are covered. The shielding layer has a shielding pattern formed from conductors and a contact section for contacting with ground potential.

SUMMARY OF THE INVENTION

It is accordingly an object of the invention to provide an antenna for a hearing apparatus and a corresponding manufacturing method, which overcome the hereinafore-mentioned disadvantages of the heretofore-known antennas and methods of this general type and in which the antenna can be fitted with a shielding apparatus in a simple manner.

With the foregoing and other objects in view there is provided, in accordance with the invention, an antenna for a hearing device, comprising a substantially cylindrical coil apparatus as an electromagnetic transmitting and/or receiving unit, a shielding apparatus surrounding the coil apparatus and having a flexible substrate as its main body, the shielding apparatus being formed as a single piece and being subdivided into three sections by two slits having ends which do not extend to or reach the edge of the substrate, and the coil apparatus being inserted through the two slits in the shielding apparatus in such a way that each of the sections only partially surrounds the coil apparatus in a circumferential direction.

With the objects of the invention in view, there is also provided a method for manufacturing an antenna for a hearing device, which comprises providing a substantially cylindrical coil apparatus as an electromagnetic transmitting and/or receiving unit, providing a shielding apparatus for shielding the coil apparatus, providing the shielding apparatus with a main body being a flexible substrate, forming the shielding apparatus as a single piece being subdivided into three sections by two slits having ends which do not extend to or reach the edge of the substrate, and inserting the coil apparatus through the two slits in the shielding apparatus in such a way that each of the sections only partially surrounds the coil apparatus in a circumferential direction.

Advantageously therefore, in order to shield a coil apparatus, a shielding apparatus on the basis of a flexible substrate is used that is divided by two slits into three sections. For the assembly, only the coil apparatus is then passed through the two slits so that the shielding apparatus is placed onto and partially surrounds the coil apparatus. A middle zone of the shielding apparatus substantially surrounds the coil apparatus on a section of its external circumference or periphery, while the outer two sections of the shielding apparatus surround the coil apparatus at opposite circumferential zones. Thus, on one hand, a very simple manufacture of the shielding apparatus and on the other hand a less laborious assembly onto the coil apparatus, are possible.

In accordance with another embodiment variant of the invention, the shielding apparatus has an electrically connected conductor structure in all three sections. In this case shielding is provided by all three sections. Alternatively, the conductor structure can also be provided, for example, in the central section only.

In accordance with a further embodiment variant of the invention, the conductor structure can have numerous parallel conductors. They can be manufactured easily and provide an efficient shielding effect.

In accordance with an added embodiment variant of the invention, the slits in the shielding apparatus are disposed parallel to each other and the conductors are disposed parallel to the slits. This has the advantage that the position of the slits can be changed without having to change the conductor structure itself. In this way shielding apparatuses of different lengths can be produced for coil apparatuses of various lengths using one and the same strip material, simply by cutting off and by then introducing the slits.

In accordance with a further embodiment variant of the invention, the three sections of the shielding apparatus are disposed one behind the other in an axial direction of the substantially cylinder-shaped coil apparatus, and the outer two of the three sections each have a first contact tab for directly contacting a ground terminal, wherein the contact tabs are electrically connected to conductors of the shielding apparatus. In this way the contact tabs for the shielding apparatus are positioned on the external periphery of the antenna, with the result that the shielding apparatus can be connected to ground easily.

In accordance with an added embodiment variant of the invention, in addition the outer two of the three sections can each have a second contact tab for directly contacting a conductor of the coil apparatus. Where the first and second contact tabs are then turned outward and are as parallel as possible, this results in an SMD-type antenna. Thus, a shielded antenna can be provided for an economically advantageous SMD production.

In accordance with an additional embodiment variant of the invention, the shielding apparatus can have a flexible circuit board with the flexible substrate. Flexible circuit boards of this type are manufactured at low cost and can be obtained in bulk. In particular, the flexible circuit board can be a printed circuit board.

In accordance with a concomitant embodiment variant of the invention, for the manufacture of an SMD component it is especially advantageous for the coil to have a core that has a segment of a circle as its cross-section. Thus, the core has a flat side parallel to its axis. This flat side can be used to place the contact tabs of the shielding apparatus in parallel so that a stable SMD component is obtained.

Other features which are considered as characteristic for the invention are set forth in the appended claims.

Although the invention is illustrated and described herein as embodied in an antenna with a shielding apparatus and a manufacturing method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is a top-plan view of a flexible disk-shaped shielding apparatus;

FIG. 3 is a top-plan view of a coil apparatus in an unshielded state;

FIG. 4 is a top-plan view of the coil apparatus of FIG. 3 inserted into the shielding apparatus of FIG. 2;

DETAILED DESCRIPTION OF THE INVENTION

Figure 1:
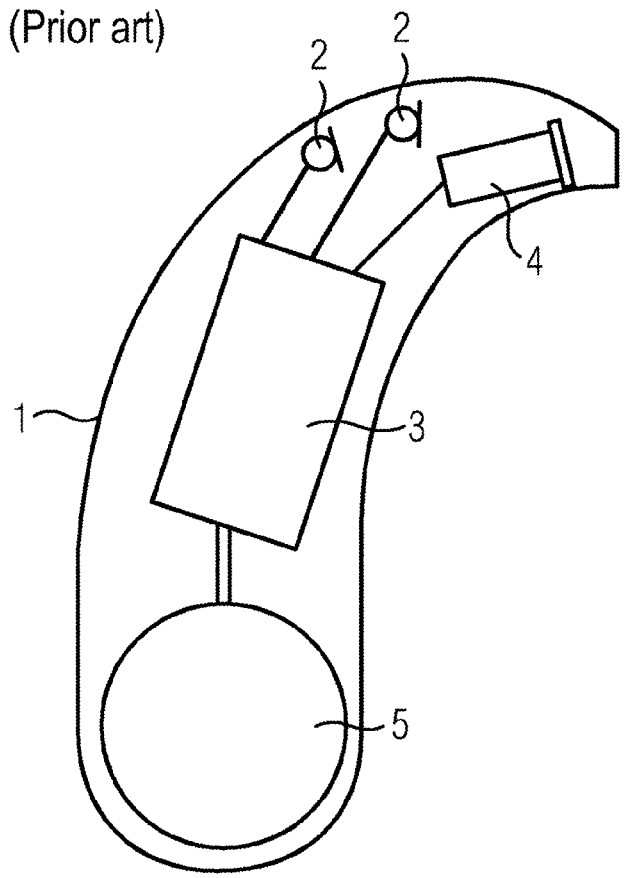
FIG. 1 is a diagrammatic, top-plan view showing a basic structure of a hearing device according to the prior art.

Referring now to the figures of the drawings in detail and first, particularly, to FIG. 1 thereof, there is seen an example of a hearing apparatus and, in particular, a hearing device which can be fitted with an antenna for the wireless transmission of signals. An antenna of this kind is outlined from various side views in FIGS. 4 to 7. FIGS. 2 and 3 are intended to clarify the manufacturing method.

If, for example, an antenna for wireless transmission is to be capable of being disposed in a hearing device near to an amplifier component, the antenna should be suitably shielded to be able to ensure a high quality of wireless transmission. It is critical for shielding to be able to ward off the E field and H field to a sufficient extent. At the same time the shielding should be easy to manufacture and easy to install. It is expedient furthermore if the shielding can use one antenna coil (coil apparatus) with different structural types in order to be able to work with instruments of lower-cost platforms as well. Coil apparatuses for hearing devices have a typical length of 5 to 6 mm, for example. It would additionally be advantageous if the shielded antennas were available as SMD components.

In order to meet all of these requirements (or even just one or more thereof), the exemplary antenna according to the present invention is proposed, which is illustrated in more detail in FIGS. 2 to 7. However certain details can also be dispensed with herein, in particular those that characterize an SMD component.

FIG. 2 shows a shielding apparatus 10 before assembly. The shielding apparatus 10 is a disk-shaped structure with a flexible substrate 11. This substrate 11 can be a polyimide film, for example. In this case two slits 12 and 13 are introduced into the substrate and subdivide the rectangular substrate into three sections 14, 15 and 16. The two slits 12 and 13 extend in this case parallel to each other and parallel to two opposing sides of the rectangular substrate 11. The slits 12 and 13 do not extend to the edge of the substrate. This means that the ends of the slits 12 and 13 are located in the interior of the substrate 11. This means furthermore that the sections 14, 15 and 16 of the substrate 11 are connected to each other as a single piece. Only a notional or imaginary extension of each of the slits 12 and 13 produces the respective section boundaries between these sections 14, 15 and 16.

A conductor structure 17 is introduced into the substrate 11 or is applied on the substrate 11. It is preferably introduced into or applied on the largest zone of the middle section 15 between the two slits 12 and 13. In the example in FIG. 2 the conductor structure 17 is disposed almost above the entire central zone of the middle section 15. Only edge zones thereof are free, for example to be able to subsequently introduce the slits 12 and 13 into the substrate 11.

The substrate 11 of the shielding apparatus 10 can also have a different shape than a rectangle. In addition the slits 12 and 13 can also be disposed diagonally. Furthermore, more than two slits, e.g. four slits, can also be provided. Although the slits in the example of FIG. 2 extend in a straight line, they are not restricted to this configuration.

In the example of FIG. 2, conductors 18 of the conductor structure 17 extend parallel to the long sides of the rectangular substrate 11. This can be advantageous for certain applications. In order to suit other requirements it may be more expedient under certain circumstances if the plurality of conductors of the conductor structure extend parallel to each other, but also parallel to the slits 12 and 13 wherein, for example, they can be connected electrically by way of a conductor extending continuously along a long side of the substrate 11. In other words, the conductor extends across the section boundaries. Consequently the shielding apparatus 10 can be punched or cut out from a strip material to any desired length, and with this constellation the slits 11, 12 can be positioned between any conductors as desired. This results in a high degree of flexibility and economical manufacturing costs.

FIG. 3 shows a coil apparatus 19 that represents the electromagnetic antenna itself. It has a substantially cylinder-shaped core 20 and a coil 21 around its external circumference or periphery. In order to maintain the flux, the core 20 protrudes significantly beyond the ends of the coil 21.

The shielding apparatus 10 is spread apart at the slit 12 for assembly of the shielding apparatus 10 on the coil apparatus 19. The coil apparatus 19 is then pushed through the spread-apart gap in the slit 12. Subsequently or simultaneously the second slit 13 is spread apart and then the coil apparatus 19 is also fed through the gap in the second slit 13. The result of the assembly can be seen in FIGS. 4 to 7.

It can be seen in the top view of FIG. 4 that the ends of the core 20 of the coil apparatus 19 protrude from the slits 12 and 13 of the shielding apparatus 10. Viewed from above, the coil 21 of the coil apparatus 19 is obscured by the middle section 15 of the shielding apparatus 10.

Figure 5:
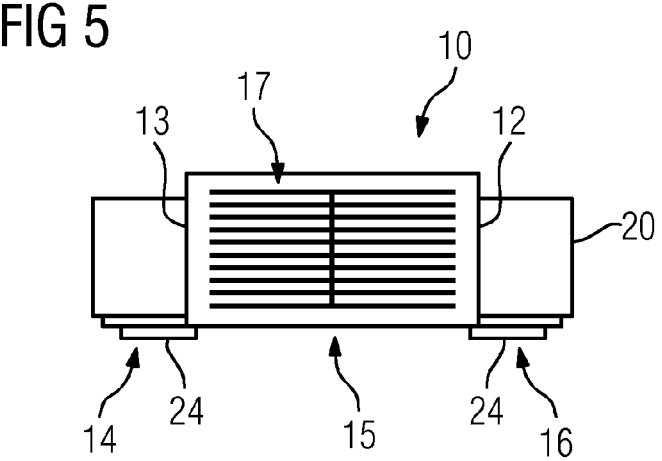
FIG. 5 is a long side-elevational view of the antenna of FIG. 4.

The long-side view of FIG. 5 shows that the middle section 15 of the shielding apparatus 10 surrounds the coil apparatus 19 on the top side, while the outer sections 14 and 16 of the shielding apparatus 10 only abut against the outer zones of the core 20 at the bottom. This is also confirmed by the end view of FIG. 6. There the section 15 of the shielding apparatus 10 fits precisely against the coil 21, which in turn surrounds the core 20. However, it is not necessary for the section 15 or the shielding apparatus 10 to fit precisely and without a gap against the coil 21 or the coil apparatus 19. Instead, such a gap is generally expedient for the assembly and can be sealed with an adhesive retrospectively.

Figure 6:
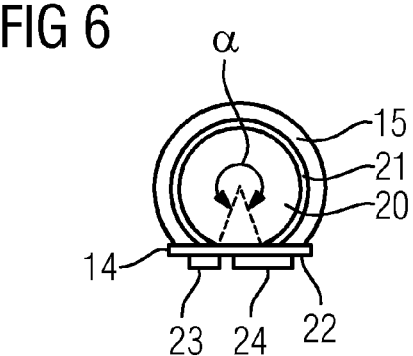
FIG. 6 is an end-elevational view of the antenna of FIG. 4.

Furthermore, as FIG. 6 shows, the substantially cylinder-shaped core 20 of the coil apparatus 19 has a segment of a circle, rather than a circle, as its cross-section transverse to the longitudinal axis. The segment of a circle has a central angle of 320°, for example. This results in a bottom surface 22 for the core 20. The outer sections 14 and 16 of the shielding apparatus 10 can be flush with this bottom surface 22. At their lower side, i.e. the side facing away from the core 20, the sections 14 and 16 each have a first contact tab 23 and a second contact tab 24. These contact tabs 23, 24 represent conventional SMD contact pads. They can be made of copper, for example, and are spaced preferably at a slight distance from the substrate 11 at the section 14 or 16 so that they can be contacted easily by contact welding or reflow soldering.

Figure 7:
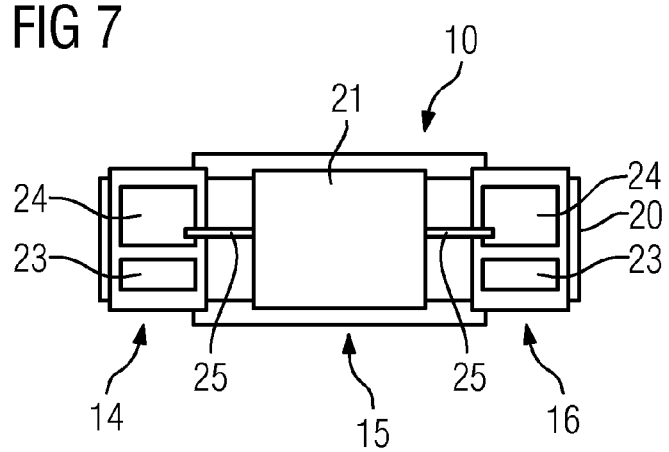
FIG. 7 is a lower side-elevational view of the antenna of FIG. 4.

Finally, as can be seen from the lower-side view of FIG. 7, the middle section 15 between the slits 12 and 13 of the shielding apparatus 10 does not fully surround the coil apparatus 19 on its circumference so that this middle section 15 forms a sleeve on which a part of its shell is open. This partially open sleeve is then held together by the sections 14 and 16 on its ends. In the present example, the coil apparatus 19 is therefore not shielded in a downward direction in the vicinity of the coil 21.

In addition, FIG. 7 shows a first contact tab 23 in each respective section 14 and 16. The first contact tabs 23 are connected to the conductor structure 17 within the shielding apparatus 10. They are typically connected to ground by using a soldering process. In principle it is sufficient if the shielding apparatus 10 has a single first contact tab 23.

In the present example the antenna, i.e. the coil apparatus 19, is embodied together with the shielding apparatus 10 as an SMD component. For this reason it is necessary for contact pads to also be provided for the terminals of the coil 21. The second contact pads 24 are therefore also located on the lower sides of the sections 14 and 16 adjacent the first contact pads 23 for ground. Terminals 25 of the coil 21 are connected, for example, to the second contact tabs 24 by using spot-welding.

Provision is therefore made according to the invention for an antenna with a sleeve-shaped shield, wherein preferably a flexible, printed circuit board is applied around the coil apparatus. In this case the shielding layer is only partially wound around the antenna.

The antenna with the sleeve-shaped shield is less sensitive to electrical and magnetic interferences than unshielded antennas, and therefore provides a better signal-to-noise ratio. Consequently, the distance for wireless communication between devices can be increased.

The simple construction of the shielding apparatus enables its use for different coil apparatuses and thus for different hearing device models. It is therefore possible to dispense with individual shielding covers. This reduces the quantity of individual parts involved in hearing device assembly. Furthermore, the shield of the invention can be manufactured for the coils in mass production. In addition, bulky shield boxes for the amplifiers of hearing devices can be avoided with the coil shield of the invention, so that ultimately the hearing devices can be miniaturized.

The invention claimed is:

1. An antenna for a hearing device, the antenna comprising:

a substantially cylindrical coil apparatus being at least one of an electromagnetic transmitting or receiving unit and having a circumferential direction, said coil apparatus including a core having an external circumference and a coil around said external circumference of said core; and a shielding apparatus surrounding said coil apparatus and having a main body being a flexible substrate with an edge;

said shielding apparatus being formed as a single piece and being subdivided into three sections by two slits having ends not reaching said edge of said substrate; and said coil apparatus being inserted through said two slits in said shielding apparatus with each of said sections only partially surrounding said coil apparatus in said circumferential direction.

2. The antenna according to claim 1, wherein said shielding apparatus has an electrically connected conductor structure in all three of said sections.

3. The antenna according to claim 2, wherein said conductor structure has a multiplicity of parallel conductors.

4. The antenna according to claim 3, wherein said slits in said shielding apparatus are disposed parallel to each other and said conductors are disposed parallel to said slits.

5. The antenna according to claim 1, wherein:
said shielding apparatus has conductors;
said cylinder-shaped coil apparatus has an axial direction;
said three sections of said shielding apparatus are disposed one behind the other in said axial direction of said cylinder-shaped coil apparatus;
said three sections of said shielding apparatus include two outer sections;
said two outer sections each have a first contact tab for directly contacting a ground terminal; and
said first contact tabs are electrically connected to said conductors of said shielding apparatus.

6. The antenna according to claim 5, wherein said coil apparatus has conductors, and said two outer sections each has a second contact tab for directly contacting a respective one of said conductors of said coil apparatus.

7. The antenna according to claim 1, wherein said shielding apparatus has a flexible circuit board with said flexible substrate.

8. The antenna according to claim 7, wherein said flexible circuit board is a printed circuit board.

9. The antenna according to claim 1, wherein said core of said coil apparatus has a cross-section being a segment of a circle.

10. A method for manufacturing an antenna for a hearing device, the method comprising the following steps:
providing a substantially cylindrical coil apparatus being at least one of an electromagnetic transmitting or receiving unit having a circumferential direction;
providing the coil apparatus with a core having an external circumference and placing a coil around the external circumference of the core;
providing a single-piece shielding apparatus for shielding the coil apparatus, the single-piece shielding apparatus having a main body being a flexible substrate having an edge;
subdividing the single-piece shielding apparatus into three sections by forming in the single-piece shielding apparatus two slits having ends not reaching the edge of the substrate; and
inserting the coil apparatus through the two slits in the shielding apparatus with each of the sections only partially surrounding the coil apparatus in the circumferential direction.

11. The antenna according to claim 6, wherein said core of said coil apparatus has a cross-section being a segment of a circle defining a bottom surface, and said outer sections of said shielding apparatus are flush with said bottom surface.

* * * * *